United States Patent
Zhang et al.

(10) Patent No.: US 7,773,797 B2
(45) Date of Patent: Aug. 10, 2010

(54) METHODS AND APPARATUS FOR MEASURING THE FLAPPING DEFORMATION OF INSECT WINGS

(75) Inventors: Guangjun Zhang, Beijing (CN); Dazhi Chen, Beijing (CN); Ying Wang, Beijing (CN); Fuqiang Zhou, Beijing (CN); Zhenzhong Wei, Beijing (CN)

(73) Assignee: Beijing University of Aeronautics and Astronautics, Beijing (CN)

( * ) Notice: Subject to any disclaimer, the term of this patent is extended or adjusted under 35 U.S.C. 154(b) by 1211 days.

(21) Appl. No.: 11/276,117

(22) Filed: Feb. 15, 2006

(65) Prior Publication Data

US 2007/0183631 A1    Aug. 9, 2007

(30) Foreign Application Priority Data

Feb. 6, 2006    (CN) .................... 2006 1 0002841

(51) Int. Cl.
  *G06K 9/00*    (2006.01)
  *H04N 15/00*    (2006.01)
(52) U.S. Cl. .................... 382/154; 348/49; 348/54
(58) Field of Classification Search ................ 382/154; 348/49, 54
  See application file for complete search history.

(56) References Cited

U.S. PATENT DOCUMENTS 5,835,133 A  * 11/1998  Moreton et al. ............... 348/49

OTHER PUBLICATIONS

El-Sayed et al, A computer-controlled video system for real-time recording of insect flight in three dimensions ,2000,Journal of insect behavior, vol. 13, No. 6, pp. 881-900.*
Zeng et al, A scanning projected line method for measuring a beating bumblebee wing, Sep. 2000, Optics Communciations 183, pp. 37-43.*
Gui et al, Investigation of flying imported fire ant alattes with a stereo high-speed imaging system, presentation on Dec. 17, 2005 at the 2005 ESA conference.*
Lu et al, A high-resolution and high-speed 3D imagign system and its appication on ATR, Apr. 2006, Optical Patern Recognition XVII, pp. 1-10.*
Willmott et al, The mechanics of flight in the hawkmoth *Manduca sexta*, The Journal of Experimental Biology 200, 2705-2722 (1997).
Dudley et al, Mechanics of forward flight in bumblebees, j. Exp. Biol. 148, 19-52 (1990).

* cited by examiner

*Primary Examiner*—Bhavesh M Mehta
*Assistant Examiner*—Kathleen S Yuan
(74) *Attorney, Agent, or Firm*—Oppedahl Patent Law Firm LLC (57) ABSTRACT

The present invention relates to a high-performance computer vision system and method for measuring the wings deformation of insects with high flapping-frequency, large stroke-amplitude and excellent mobility during free-flight. A geometrical optic unit composed of a polyhedral reflector with four reflection-planes and four planar reflectors is used to image one high-speed CMOS camera to four virtual cameras, combined with double laser-sheet sources, multiple virtual stereo and structured-light sensors are available to observe the free-flight of insect at different viewpoints simultaneously. In addition, an optoelectronic guiding equipment is included to lead the free-flight of insect and trigger the camera to capture the image sequences of insect-flight automatically. The deformation of insect-wings can be reconstructed by the spatial coordinates of wing-edges and the distorted light-lines projected on the surface of wings.

7 Claims, 7 Drawing Sheets

METHODS AND APPARATUS FOR MEASURING THE FLAPPING DEFORMATION OF INSECT WINGS

FIELD OF THE INVENTION

The present invention relates to a computer vision system and method for measuring the flapping motion of insect wings, and more particularly to a computer vision system composed of multiple virtual stereo and structured-light sensors to observe the free-flight of insects and reconstruct the three-dimensional deformation of bilateral wings.

In addition, the invention relates to an optoelectronic guiding equipment and method to lead the fee-flight of insect and trigger the high-speed camera to capture the image sequences automatically.

BACKGROUND OF THE INVENTION

Detailed information on the flapping motion of insect wings is essential for aerodynamic modeling of insect-flight and the aerodynamic mechanisms being employed in micro-air vehicles (MAV). In recent years, many insects have been studied, but most researches were aimed at the unilateral wing, and detailed study on the flapping deformation of bilateral wings are not yet achieved, especially for the insects with high flapping-frequency, large stroke-amplitude and excellent mobility, such as fly and honeybee. It is obvious that insects can fly freely by the interaction of the bilateral wings, which means that to measure the flapping deformation of bilateral wings will explain the flight mode of insects more clearly.

Untouched observation based on high-speed camera is a general method for measuring the flapping motion of insect wings. Researchers usually use high-speed camera to capture the image-sequences of insect-flight, and calculate the deformation of wings by analyzing those images. According to the difference of system configuration, two kinds of methods can be summarized from the existent technologies. One is single-camera system, which is written in the paper "A Scanning Projected Line Method for Measuring a Beating Bumblebee Wing" presented by L. Zeng, Q. Hao and K. Kawachi. In this method, double laser-sheet sources are used to project multiple parallel light-lines on the wings of a tethered bumblebee and a high-speed camera is used to capture the images, then the deformation of wing is reconstructed by the model of structured-light sensor. Because the stroke and torsion amplitude of bumblebee wing is very large, the surface of wing will be parallel to the projective direction of camera for some moment and no image of wing surface can be formed. This problem is called blind observation region of camera, which results in that only the deformation of a unilateral wing can be measured. Another method is multiple-camera system, which is written in the Paper "The Mechanics of Flight in the Hawkmoth Manduca Sexta" presented by A. P. Willmott, C. P. Ellington. In this method, two cameras are used to observe the flapping motion of a unilateral wing of hawkmoth at two different viewpoints to solve the problem of blind observation region of camera. The main shortcoming of this method is that it is very difficult to simultaneously capture the images of insect-flight by different cameras.

Figure 2:
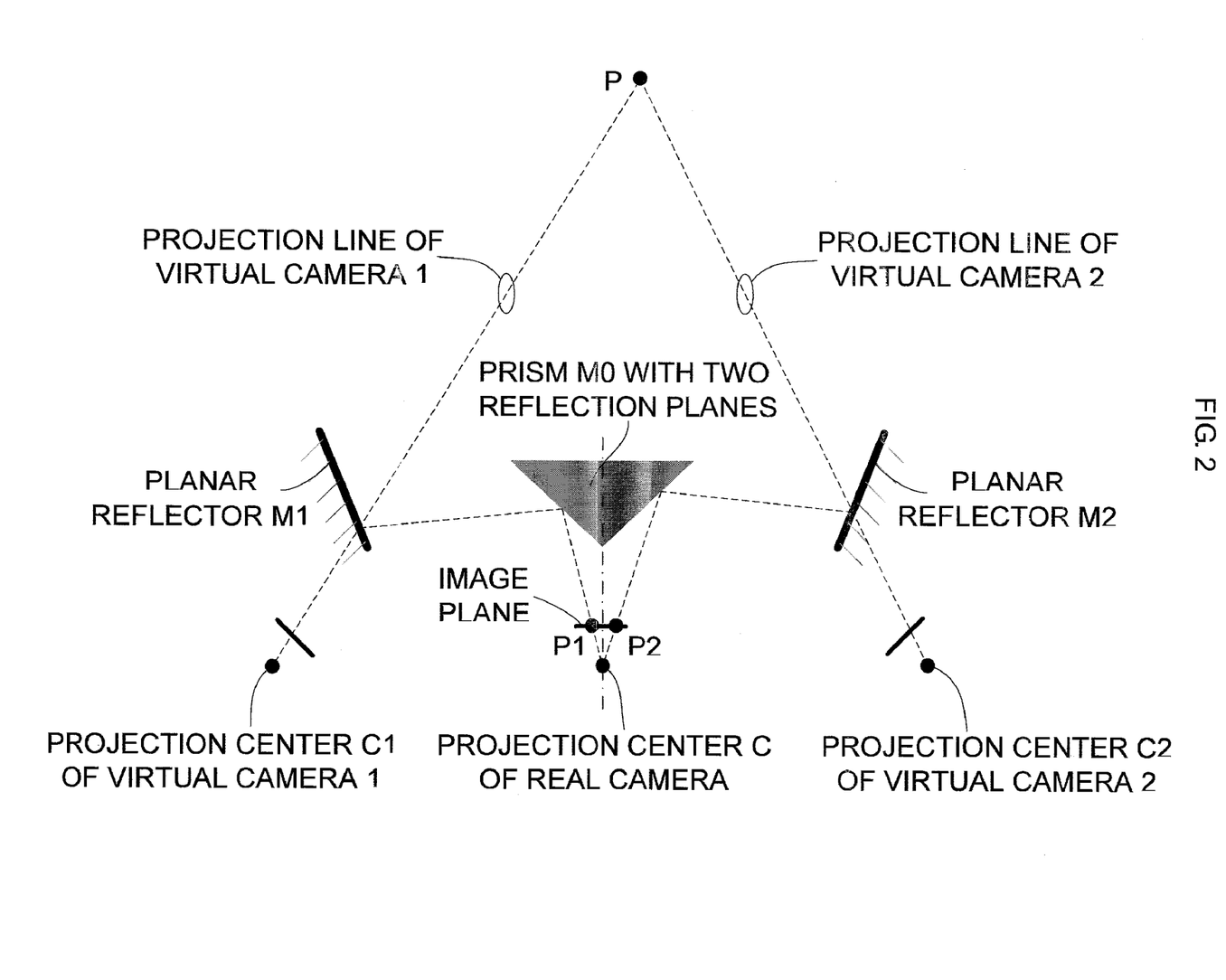
FIG. 2 is a view for showing a stereo sensor composed of two virtual cameras.

The problems of existent technologies for measuring the flapping motion of insects are analyzed and the configuration of multiple virtual cameras applied in stereo-vision is introduced. FIG. 2 shows a typical stereo vision system with two virtual cameras, from which we can see that one real camera is imaged to two virtual cameras by the reflection of two planar reflectors and a prism with two reflection planes. For a point P in the observation region, two image points are formed on the image plane of camera, which also can be explained that two virtual cameras observe point P at two different viewpoints. According to this configuration, we can compose a geometrical optic component by reflectors to image one real camera to multiple virtual cameras to observe the insect-flight at different viewpoints and avoid the blind observation region of camera. Moreover, the most important is that the asynchronism in image capturing of different cameras dose not exist as all the virtual cameras are imaged from one real camera.

Figure 3:
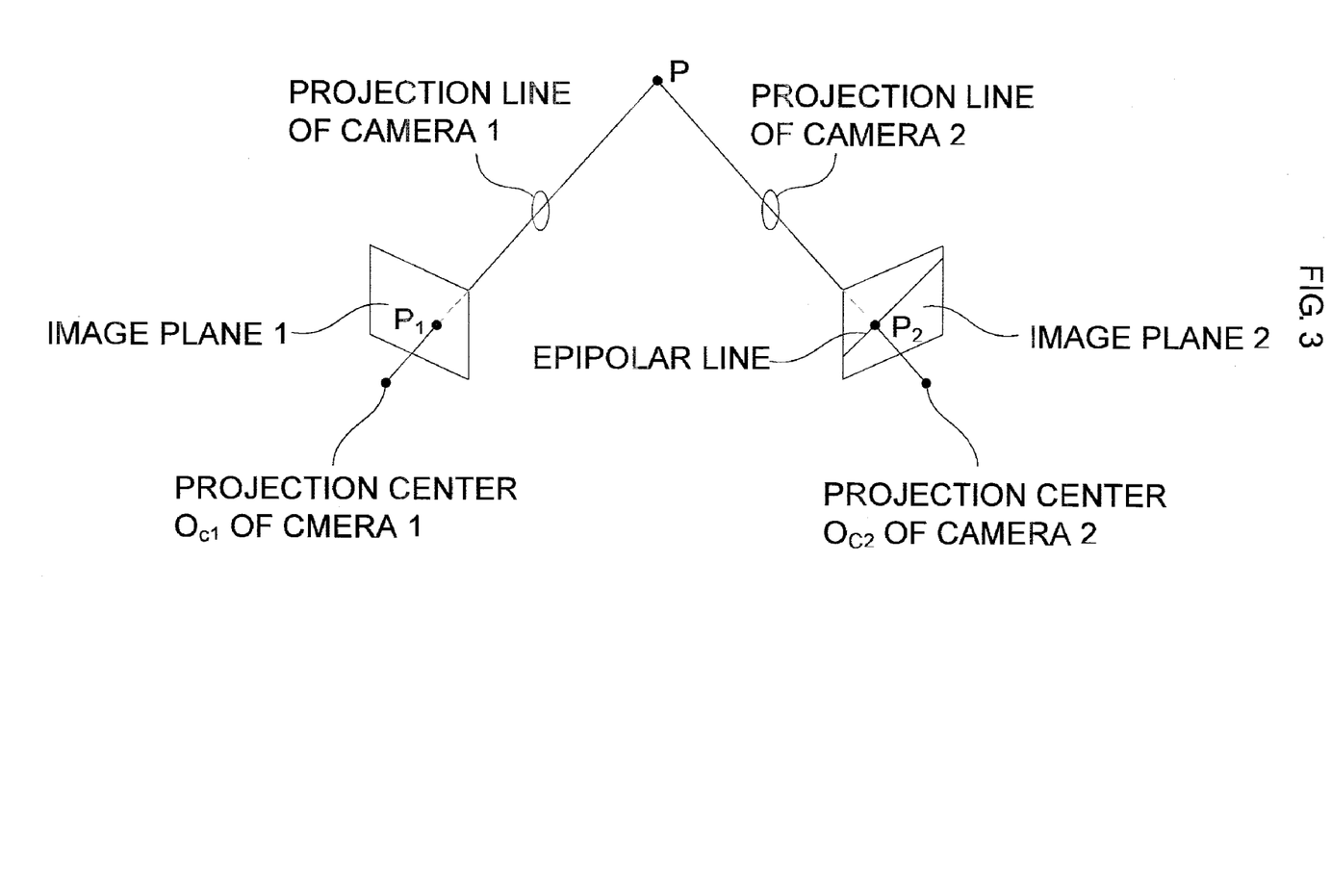
FIG. 3 is a view for showing the model of construction by a stereo sensor.

In the configuration of multiple virtual cameras, every two virtual cameras form one stereo sensor. FIG. 3 shows the model of stereo sensor composed of two cameras. For a point P in the observation region, two image points $P_1$ and $P_2$ appear respectively on the image planes of two cameras by two straight projective lines crossing with the image planes, and the spatial coordinate of P can be calculated by the intersection of these two projective lines. Moreover, if the image position of P on image plane 1 is known, its corresponding position on image plane 2 must locate on a straight line, which we call "epipolar line". Using multiple virtual cameras to observe the flight of insect, we can determine the spatial coordinate of wing-edges by the model of stereo sensor.

Figure 4:
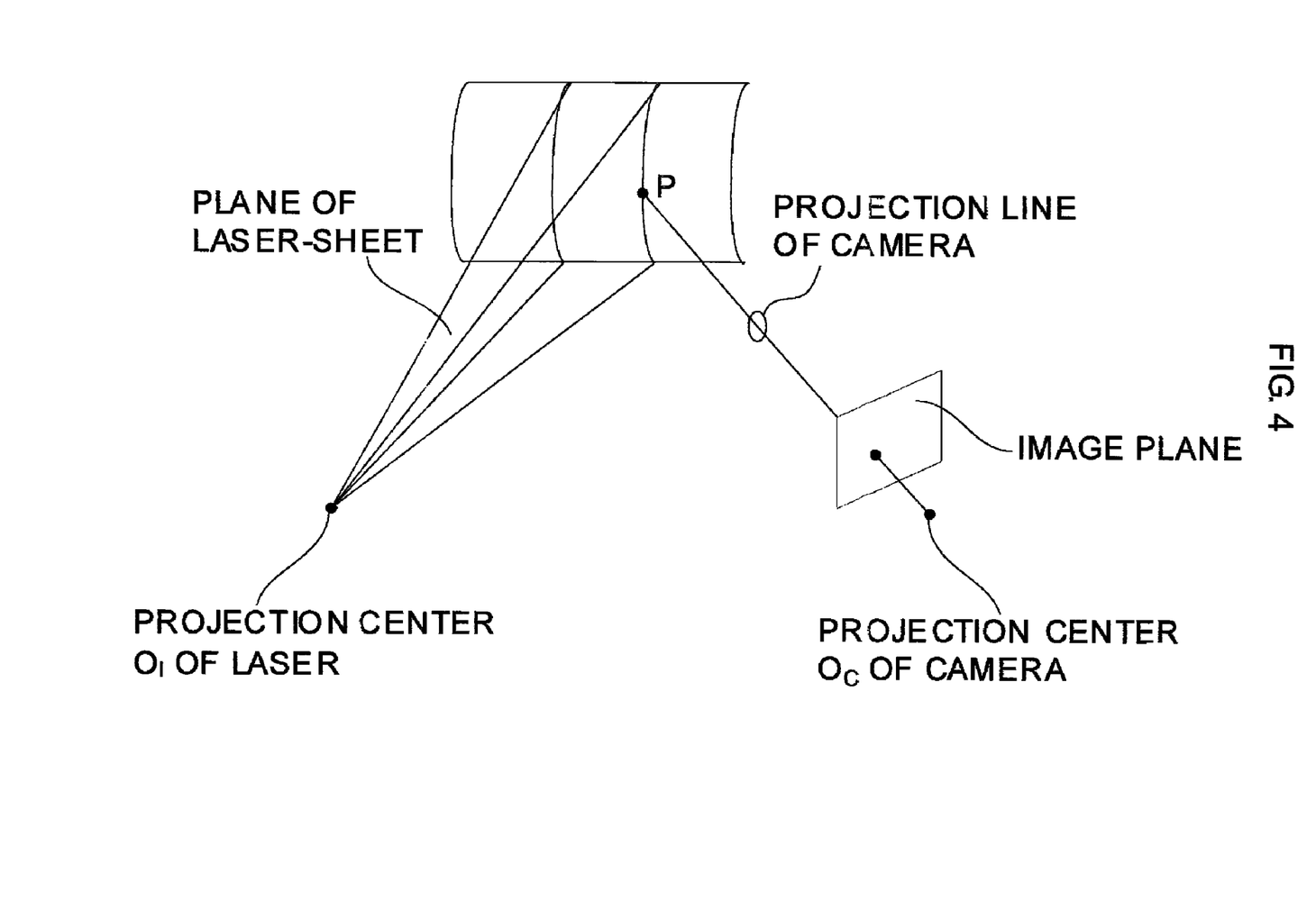
FIG. 4 is a view for showing the model of construction by a grating structured-light sensor.

Because the flapping-frequency of insect wings is very high, the features on the surface of wings are very blurry in the images captured by the camera and only wing-edges can be extracted to calculate the deformation of insect wings. In order to get more detailed information about the surface of wings, active means is needed to project some features with characteristic geometrical configuration to the insect, such as laser-sheet source with grating for casting multiple parallel light-lines with strong intensity. FIG. 4 shows the theory of reconstruction by grating structured-light sensor, from which we can see that multiple distorted light-lines are formed by laser-sheets crossing with the surface of object to be measured. The spatial coordinate of point P on laser-sheet can be calculated by the intersection of a straight projective line and the plane of laser-sheet. Based on this model, the three-dimensional deformation of wings surface can be reconstructed after the image positions of distorted light-lines are detected.

In addition to the configuration of observation system, effective guiding equipment is necessary for leading insect to fly though the observation region because the excellent mobility and high motion-speed of insect makes it very difficult to capture the images. Many methods have been proposed for different insects according to their biological behaviors, such as food guidance and light guidance. For example, Dudley and Ellington initiated and sustained the flight of bumblebee by ultraviolet light and two rotating drums with alternating black and white stripes covered, which is written in the Paper "Mechanics of Forward Flight in Bumblebees". In real experiment, we choose honeybee as the research object, which is the representative of insects with high flapping-frequency and large stroke-amplitude. After many experiments for analyzing the habits of honeybee, an optoelectronic guiding equipment is developed to lead the flight of honeybee and trigger the camera to capture the image sequences automatically.

SUMMARY OF THE INVENTION

Accordingly, it is an object of the present invention to provide a high-performance apparatus and method being capable of measuring three-dimensional deformation of bilateral wings, especially for insects with high flapping-frequency, large stroke-amplitude and excellent mobility, such as honeybee.

Another object of the invention is to provide an equipment and method capable of guiding the free-flight of insect and making the observation system capture the image sequences of insect free-flight easily.

For these purposes, in accordance with the first aspect of the invention, there is provided an insect-wings deformation measurement system and method for observing the flapping motion of insect wings and obtaining the detailed information of wings surface during its free-flight, which comprises a geometrical optic unit for imaging a high-speed CMOS camera to four virtual cameras to observe the flight of insect at multiple viewpoints and captures the image sequences, and double laser-sheet sources for projecting multiple parallel light-lines on the surface of wings and supplying the information about the deformation of wings.

The insect-wings deformation measurement apparatus or method according to the first aspect of the invention further comprises a deformation reconstruction means comprising multiple virtual stereo sensors for calculating the spatial coordinates of wing-edges, and multiple virtual grating structured-light sensors for calculating the spatial coordinates of distorted light-lines projected on the surface of wings, and a means for reconstructing the three-dimensional deformation of insect wings by these features.

In addition, the insect-wings deformation measurement apparatus and method according to the first aspect of the invention provides a calibration means with high precision for calculating the parameters of system model, which comprises camera calibration, structured-light sensor calibration and stereo sensor calibration.

Furthermore, the second aspect of the insect-wings deformation measurement apparatus and method provides a guiding means comprising a light-source for leading the insect to fly through the observation region of system and making the camera observe the flapping motion of insect easily.

In addition, the insect-wings deformation measurement apparatus and method according to the second aspect of the invention further comprises an electronic equipment for triggering the camera to capture the image sequences of insect-flight automatically when the insect is led by the guiding equipment to fly though the observation region of system.

BRIEF DESCRIPTION OF THE SEVERAL VIEWS OF DRAWING

The accompanying drawings, which are incorporated in and constitute a part of specification, illustrate an exemplary embodiment of the present invention and, together with the general description given above and the detailed description of the preferred embodiment given below, serve to explain the principles of the present invention.

DETAILED DESCRIPTION OF THE INVENTION

Figure 1:
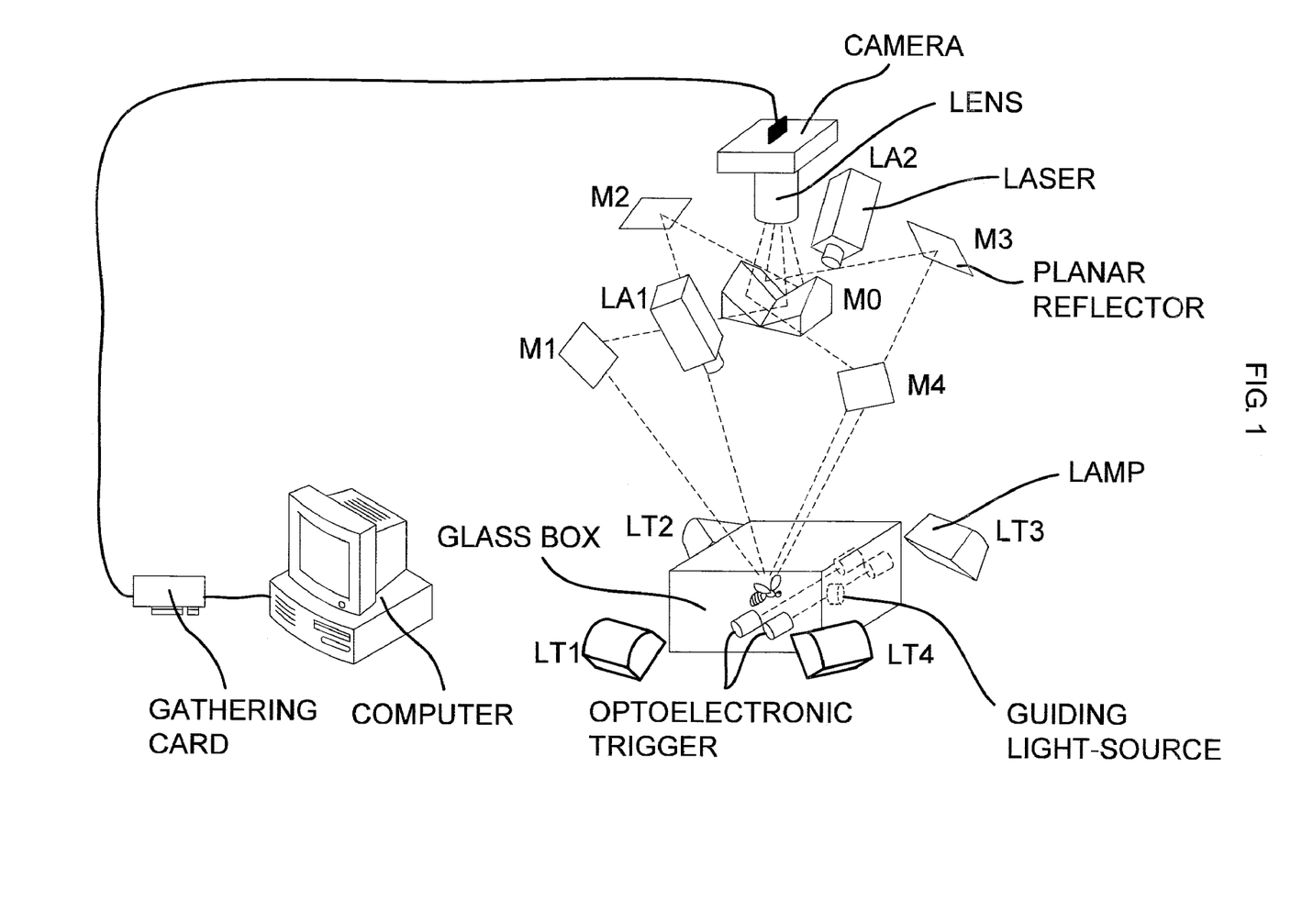
FIG. 1 is a view for showing the configuration of the insect-wings deformation measurement system.

FIG. 1 shows the configuration of insect-wings deformation measurement system, which consists of a high-speed CMOS camera, a close focusing lens, an image gathering card, a geometric optic unit including four planar reflectors (M1, M2, M3, M4) and a polyhedral reflector with four planes of reflection (M0), double laser-sheet sources (LA1 and LA2), four background lamps (LT1 and LT2), a glass box for insect free-flight and an optoelectronic equipment for leading the flight of insect.

As shown by FIG. 1, camera, lens and gathering card compose the image capturing equipment to capture the image sequences of insect-flight. The high-speed CMOS camera is produced by America Redlake Co. with maximum capture frequency of 10,000 f/s. The close focusing lens is produced by Japan Nikon Co. with focus length of 55 mm.

The geometric optic unit is a key component in this system. The polyhedral reflector M0 has four reflection planes. M1, M2, M3 and M4 are four planar reflectors and are placed symmetrically around M0. The high speed CMOS camera is placed above M0. According to the "pinhole model" of camera and the borderline condition of the mirrors, we can get a mutual area for imaging. For a certain point in this area, it can be projected to four points on the image plane of camera through the reflection of M0, M1, M2, M3 and M4, which also can be explained as that one real camera is imaged to four virtual cameras by the geometric optic unit and observes the point in the mutual area at four different viewpoints simultaneously.

Two diode lasers with diffraction gratings are used as structured-light sources to project multiple light-lines, which are placed on the two sides of camera symmetrically. The wavelength of lasers is 670 nm, the power is 500 mW and the work distance is 30 mm. For honeybee, seventeen light-lines can be project on the surface of its body, and the interval between every two lines is about 1.2 mm. Just like the camera, the problem of blind area is also existent for laser-sheet source. Because the large amplitude of flapping and torsion of insect wings, the surface of wing may be parallel to the laser-sheet for some moment, which results in that no light-lines are projected on the surface of wing. Double-laser configuration can avoid this problem for the projective directions are complementary.

Four incandescent lamps with power of 1000 W are used as the background light sources. Because the optical sensitivity of high speed CMOS camera is low, we use a white board with excellent diffuse reflection characteristic as the background. The light shot from the four lamps is reflected by the reflection board and provides background light with enough intensity for the four virtual cameras respectively.

Figure 5:
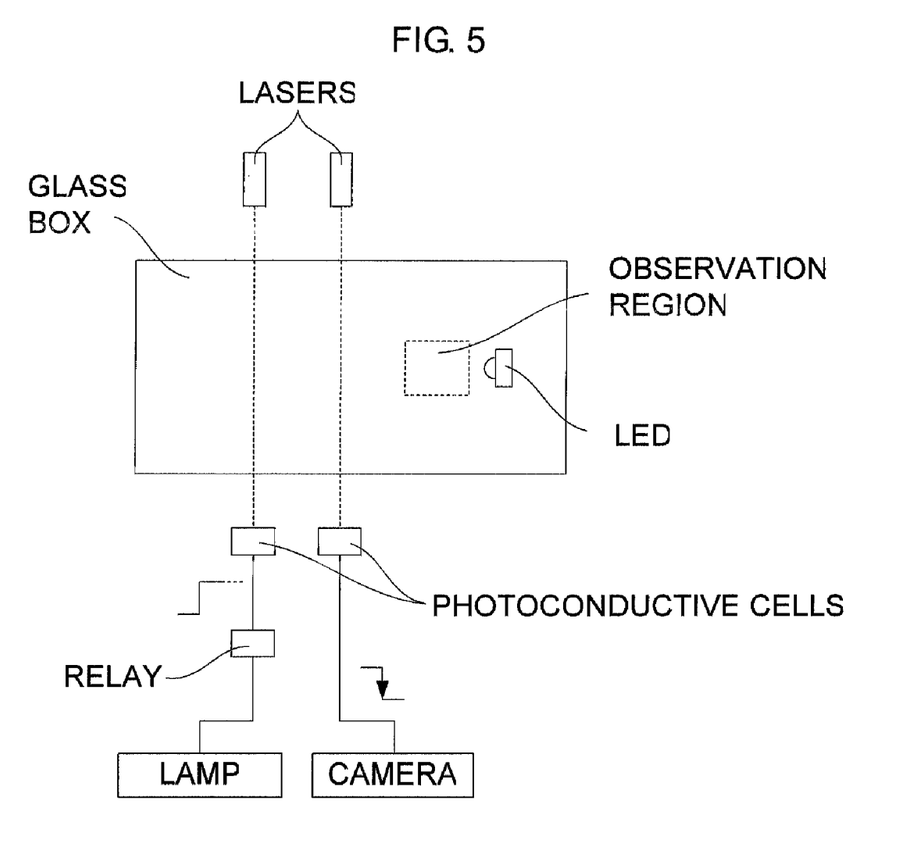
FIG. 5 is a view for showing the ichnographical configuration of the equipment for guiding the free-flight of insect.

FIG. 5 shows the ichnographical configuration of the equipment for guiding the free-flight of insect. The experiment region is a glass box with dimension of 300 mm×200 mm×250 mm. A high-power LED casting white light with output power of 3 W is placed at the front of the observation region as the guiding light-source. Two electronic switches composed of laser sources and photoconductive cells are place at the back of the observation region. When the insect is led by the guiding light-source to fly through the observation region, the farther switch will be triggered firstly and the output pressure of corresponding cell will be translated to a normal high-level pressure by A/D circuit to switch on the relay and turn on the background lamps. Then the closer switch will be triggered and the output pressure of corresponding cell will be translated to a falling edge to make the camera capture the image sequences of insect-flight automatically.

In the configuration of insect-wings deformation measurement system, every two virtual cameras compose a stereo sensor, and a virtual camera and a laser-sheet source compose a grating structured-light sensor. FIG. 3 shows the model of reconstruction by a stereo sensor, from which we can see that the spatial coordinate of point P can be calculated by the intersection of two straight lines connecting P and the projection centers of two cameras, and the relationship between the spatial coordinate of P and corresponding image positions can be expressed as follows:

[Equation 1] (1)

$$\rho \begin{bmatrix} u_1 \\ v_1 \\ 1 \end{bmatrix} = A_1 [R_1 \ T_1] \begin{bmatrix} x_w \\ y_w \\ z_w \\ 1 \end{bmatrix}$$

$$\rho \begin{bmatrix} u_2 \\ v_2 \\ 1 \end{bmatrix} = A_2 [R_2 \ T_2] \begin{bmatrix} x_w \\ y_w \\ z_w \\ 1 \end{bmatrix}$$

where $$A = \begin{bmatrix} f_x & 0 & u_0 \\ 0 & f_y & v_0 \\ 0 & 0 & 1 \end{bmatrix}$$

is the intrinsic parameters of camera, $$R = \begin{bmatrix} r_1 & r_4 & r_7 \\ r_2 & r_5 & r_8 \\ r_3 & r_6 & r_9 \end{bmatrix}$$

is the rotation matrix, $$T = \begin{bmatrix} t_x \\ t_y \\ t_z \end{bmatrix}$$

is the translation vector. According to equation (1), a unique spatial coordinate of P can be calculated by "least-square method".

For insect-wings deformation measurement, we can use the virtual stereo sensor to determine the spatial coordinates of wing-edges including leading edge and trailing edge. For a point on the wing-edge in the image of one virtual camera, its corresponding position in the image of another virtual camera must locate on the "epipolar line", which can be expressed by the following equation, where H represents 3×3 projective transformation marix.

[Equation 2] (2)

$$\lambda \begin{bmatrix} u_1 \\ v_1 \\ 1 \end{bmatrix} = H \begin{bmatrix} u_2 \\ v_2 \\ 1 \end{bmatrix}$$

After extracting the sub-pixel position of a point in the image of one virtual camera, its corresponding position in the image of another virtual camera can be determined by this constraint, and the spatial coordinate of this point can be calculated by equation (1).

FIG. 4 shows the model of a grating structured-light sensor consists of a camera and multiple laser-sheets. Suppose that the spatial coordinate of point P on one laser-sheet is ($x_w$, $y_w$, $z_w$), and the position of corresponding image point on the image plane is (u, v). According to the "pinhole model" of camera, we can get such relation as follows:

[Equation 3] (3)

$$\rho \begin{bmatrix} u \\ v \\ 1 \end{bmatrix} = \begin{bmatrix} f_x & 0 & u_0 \\ 0 & f_y & v_0 \\ 0 & 0 & 1 \end{bmatrix} [R \ T] \begin{bmatrix} x_w \\ y_w \\ z_w \\ 1 \end{bmatrix}$$

On the other hand, P is consistent with the equation of the laser-sheet

[Equation 4]

$$ax_W + by_W + cz_W + d = 0 \quad (4)$$

According to equation (3) and equation (4), we can calculate the spatial coordinates of the distorted light-lines projected on the surface of insect-wings after the sub-pixel positions of the light-lines in the image are extracted and the parameters of camera and laser sheet are calibrated.

The calibration of insect-wings deformation measurement system includes camera calibration and laser-sheet calibration, in which the building of target points is a chief progress. For camera, the spatial coordinates of a series of target points and corresponding image coordinates are necessary for calibrating its intrinsic and extrinsic parameters. For laser sheet, the spatial coordinates of light points on the sheet are needed to fit the equation of light plane.

A high-performance method and apparatus with high-precision for system calibration is developed specially, which is based on planar target board and double electronic theodolites. The principle of calibration is shown as FIG. 6. Suppose that the coordinate of a target point P on the target board is ($x_b$, $y_b$, 0), and its coordinate in the space of double-theodolite is ($x_w$, $y_w$, $z_w$). The relation between these two coordinates can be expressed as follows.

Figure 6:
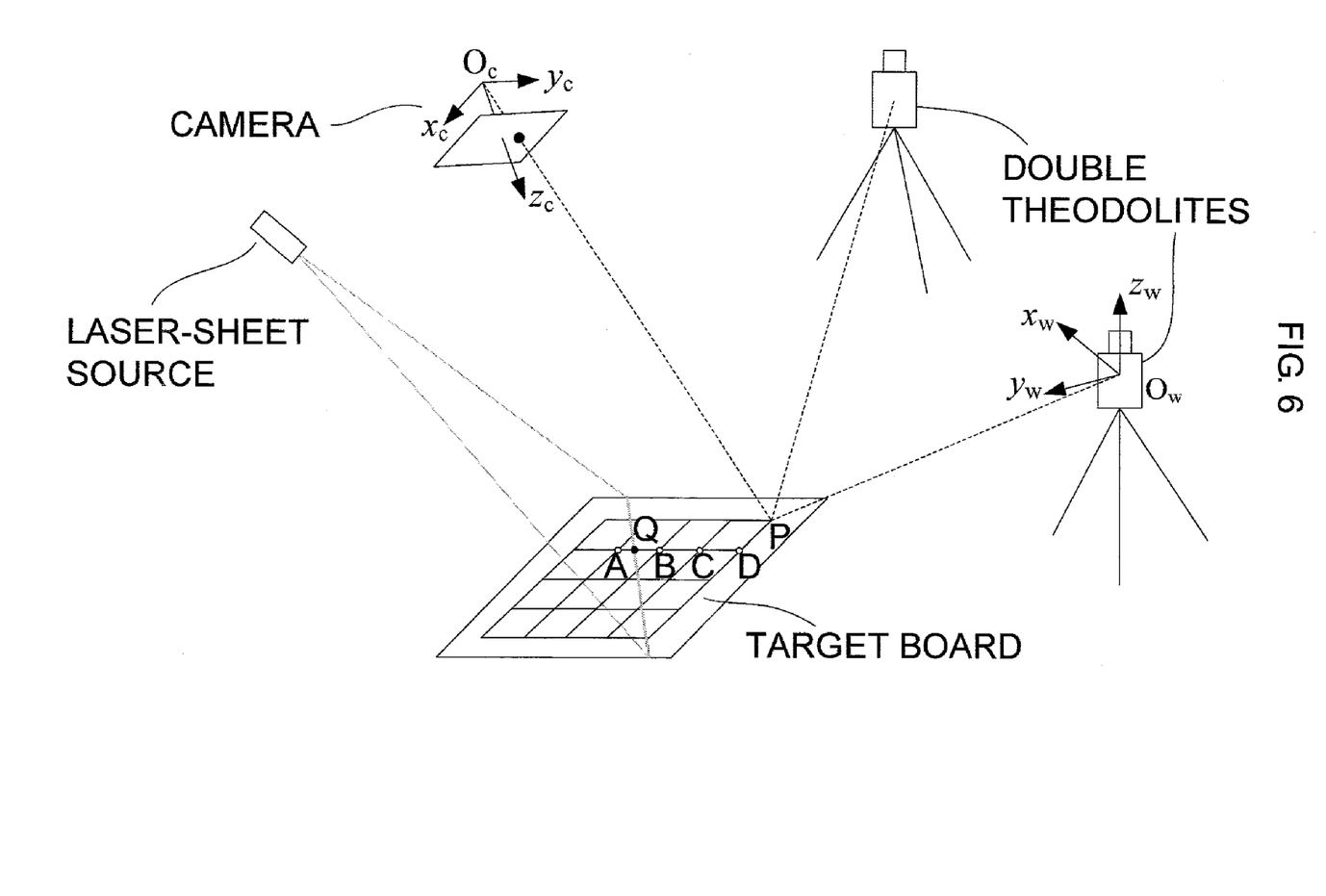
FIG. 6 is a view for showing the method and equipment for system calibration.

[Equation 5] (5)

$$X_w = [R_{bw} \ T_{bw}] \begin{bmatrix} X_b \\ 1 \end{bmatrix}$$

where $X_w = [x_w y_w z_W]^T$, $Xb = [x_b y_b z_b]^T$, $R_{bw}$ is the rotation matrix between the space of target board and the space of double-theodolite, and $T_{bw}$ is the translation vector. In general, we can get a unique solution for $R_{bw}$ and $T_{bw}$ after three target points are measured by double-theodolite system. Then the coordinates of other target points in the space of double-theodolite can be determined by equation (5). If the images of target board on n (n≧3) noncoplanar positions are captured, we can calibrate the parameters of camera by "noncoplanar algorithm".

The calibration of laser-sheet can be realized by the theory of "cross-ratio invariance". Suppose that A, B, C, and D are four collinear target points, and Q is the interaction between the laser sheet and the line fitted by A, B, C, and D. According to the theory of "cross-ratio invariance", we can calculate the coordinate of Q on the target board. Then the coordinate of Q in the space of double-theodolite can be calculated by equation (5). Moving the target board, four noncollinear points on the laser sheet can be determined by this method, and the equation of the laser-sheet can be fitted by these four points.

Figure 7:
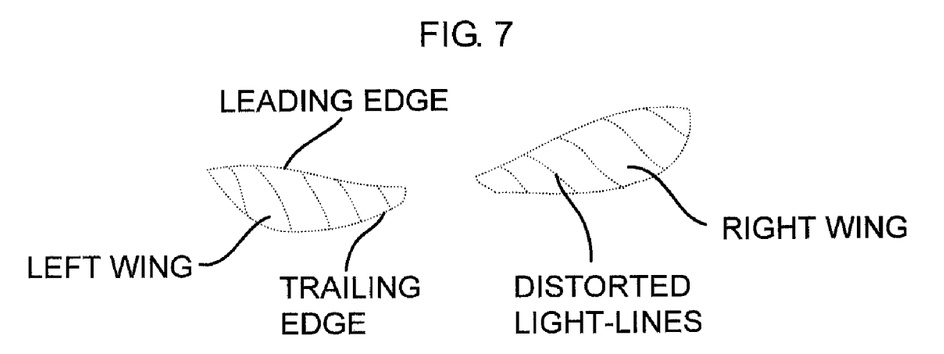
FIG. 7 is a view for showing the reconstruction results for the three-dimensional deformation of honeybee wings.

That is, the present invention has been disclosed in the illustrated form. Based on the method described above, we can reconstruct the three-dimensional deformation of honeybee wings, and the detailed experimental progresses are described as follows:

Select some honeybees into the experimental box. Turn on the laser-sheet source and the guiding light-source to excite the insect to fly. When the insect is led by the light-source to fly through the observation region of the camera, the opto-electronic switch will be triggered and the image sequences will be captured by the camera automatically. Calibrate the parameters of the system. Then extract the sub-pixel positions of the distorted light-lines and calculate their spatial coordinates according to the model of structured-light sensor. Extract the sub-pixel positions of wing-edges and calculate the spatial coordinates based on the model of stereo sensor. Finally, reconstruct the three-dimensional deformation of insect wings by the spatial coordinates of these features. FIG. 7 shows the reconstruction results of a pair of honeybee wings by the method presented in this patent.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for measuring the flapping deformation of wings of an insect, comprising:
providing a polyhedral reflector with four reflection planes and four planar reflectors that are used to image one camera to four virtual cameras to capture image sequences of insect-flight when the insect is led to fly through an observation region of system;
wherein spatial coordinates of wing-edges are calculated by a virtual stereo sensor model comprised of two of said virtual cameras after parameters of said one camera are calibrated; and
wherein deformation of said wing-edges of said insect is reconstructed by the spatial coordinates of said wing-edges.

2. The method of claim 1, further comprising:
providing one or more virtual structured-light sensors comprised of one of said virtual cameras and a laser-sheet source;
wherein the three-dimensional deformation of said insect wings is reconstructed by spatial coordinates of the light-lines projected on a surface of wings calculated by a model of said one or more virtual structured-light sensor.

3. The method of claim 2, further including the step of calibrating parameters of the virtual camera and the laser-sheet.

4. The method of claim 3, wherein said calibrating the parameters of the virtual cameras includes imaging positions of a series of target-points on a movable planar target-board; wherein the spatial coordinates of the target-points are calculated by equation as follows,

[Equation]

$$X_w = [\,R_{bw} \quad T_{bw}\,]\begin{bmatrix} X_b \\ 1 \end{bmatrix}$$

wherein $X_w=[x_w\ y_w\ z_w]^T$ is spatial coordinate of target-point in space of a double-theodolite; $X_b=[x_b\ y_b\ z_b]^T$ is spatial coordinate of target-point in space of the planar target-board; $R_{bw}$ is a rotation matrix between the spaces of the double-theodolite and the planar target-board, and $T_{bw}$ is a translation vector.

5. The method of claim 3, wherein said step of calibrating the parameters of the laser-sheet is accomplished by collecting a series of light-points on the laser-sheet.

6. The method of claim 2, wherein said step of calculating the spatial coordinates of the light-lines projected on the surface of the wings further comprising:
the step of obtaining the spatial coordinates of light-lines as calculated by equation as follows,

[equation]

$$\rho \begin{bmatrix} u \\ v \\ 1 \end{bmatrix} = \begin{bmatrix} f_x & 0 & u_0 \\ 0 & f_y & v_0 \\ 0 & 0 & 1 \end{bmatrix} [R\ T] \begin{bmatrix} x_w \\ y_w \\ z_w \\ 1 \end{bmatrix}$$

$$ax_w + by_w + cz_w + d = 0$$

Wherein, p is an arbitrary ratio coefficient; $(X_w, Y_w, Z_w)$ is coordinate of a point in space of double-theodolite; (u, v) represents a corresponding image position on an image plane of the camera; $(u_0, v_0)$ represents coordinates of central point or position of the image plane of the camera; a, b, c, d are coefficients of the equation of the laser-sheet in space of double-theodolite; $f_x$, $f_y$ are focal length respectively in X-axis direction and Y-axis direction of camera coordinate system; R is a rotation matrix, and T is a translation vector.

7. The method of claim 1, wherein said step of calculating the spatial coordinates of the wing-edges comprising:
the step of obtaining a spatial coordinate of a point on the wing-edge as calculated by equation as follows,

[Equation]

$$\rho \begin{bmatrix} u_1 \\ v_1 \\ 1 \end{bmatrix} = A_1 [\, R_1 \quad T_1 \,] \begin{bmatrix} x_w \\ y_w \\ z_w \\ 1 \end{bmatrix}$$

$$\rho \begin{bmatrix} u_2 \\ v_2 \\ 1 \end{bmatrix} = A_2 [\, R_2 \quad T_2 \,] \begin{bmatrix} x_w \\ y_w \\ z_w \\ 1 \end{bmatrix}$$

wherein, p is an arbitrary ratio coefficient; (Xw, Yw, Zw) is coordinates of a point on the wing-edge in space of double-theodolite; $(u_1, v_1)$ and $(u_2, v_2)$ are image positions of the point on the images of two of said virtual cameras; A is an internal parameter matrix of said one camera; R is a rotation matrix, and T is a translation vector.

* * * * *